US011283793B2

(12) United States Patent
Khanna et al.

(10) Patent No.: US 11,283,793 B2
(45) Date of Patent: Mar. 22, 2022

(54) SECURING USER SESSIONS

(71) Applicant: Oracle International Corporation, Redwood Shores, CA (US)

(72) Inventors: Ranjan Khanna, Edina, MN (US); Sreenivasa R. Chitturi, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 238 days.

(21) Appl. No.: 16/164,750

(22) Filed: Oct. 18, 2018

(65) Prior Publication Data
US 2020/0128002 A1    Apr. 23, 2020

(51) Int. Cl.
*H04L 29/06* (2006.01)
*H04L 9/32* (2006.01)

(52) U.S. Cl.
CPC ........ *H04L 63/0838* (2013.01); *H04L 9/3242* (2013.01); *H04L 63/0846* (2013.01)

(58) Field of Classification Search
CPC ............... H04L 63/0838; H04L 9/3242; H04L 63/0846; H04L 9/3228; H04L 9/3239; H04L 63/00; H04L 63/18; H04L 9/0861; H04L 63/083; H04L 2463/082; H04L 63/0815; G06F 21/335
See application file for complete search history.

(56) References Cited

U.S. PATENT DOCUMENTS

| 7,231,526 | B2 | 6/2007 | Hon et al. |
| 8,132,243 | B2 | 3/2012 | Bychkov |

(Continued)

FOREIGN PATENT DOCUMENTS

| CN | 106161354 A | * | 11/2016 | |
| WO | WO-2016079429 A1 | * | 5/2016 | ............... H04L 9/30 |
| WO | WO-2017115427 A1 | * | 7/2017 | ............. G06F 21/31 |

OTHER PUBLICATIONS

Secure Two-Factor Authentication App, Duo Mobile, Duo Security, Available online at: https://duo.com/product/trusted-users/two-factor-authentication/duo-mobile, Retrieved from Internet on Jul. 21, 2018, pp. 1-10.

(Continued)

*Primary Examiner* — David Garcia Cervetti
(74) *Attorney, Agent, or Firm* — Kilpatrick Townsend & Stockton LLP

(57) ABSTRACT

Techniques for securing user sessions using a time-based one-time password (TOTP) generated from a shared secret. The shared secret can be a cryptographic hash of one or more user credentials. In response to a successful authentication based on the user credential(s), a session is created. The authentication is performed in connection with an initial access request from a client application. A subsequent access request for a protected resource during the session is processed by extracting a session cookie and a TOTP and generating a corresponding TOTP using the shared secret. The TOTP can be generated by combining the shared secret with one or more additional parameters such as a Uniform Resource Locator associated with the resource, or the session cookie. Access to the protected resource is conditioned upon the session, which is identified by the session cookie, being valid and upon the TOTPs matching.

17 Claims, 9 Drawing Sheets

(56) References Cited

U.S. PATENT DOCUMENTS

| | | | |
|---|---|---|---|
| 8,151,327 B2 | 4/2012 | Eisen | |
| 8,627,424 B1 | 1/2014 | O'Malley et al. | |
| 8,838,973 B1* | 9/2014 | Yung | H04L 63/0838 |
| | | | 713/175 |
| 9,294,476 B1* | 3/2016 | Lurey | H04L 63/0492 |
| 9,596,223 B1* | 3/2017 | Mezei | H04W 12/04 |
| 9,648,015 B1* | 5/2017 | Avetisov | G06F 21/40 |
| 10,068,082 B1* | 9/2018 | Zheng | G06F 21/34 |
| 10,084,773 B2* | 9/2018 | Burch | H04L 9/3228 |
| 10,223,690 B2* | 3/2019 | Hird | G06Q 20/34 |
| 10,447,682 B1* | 10/2019 | Du Lac | H04L 9/3247 |
| 10,469,262 B1* | 11/2019 | Schroeder | H04L 63/166 |
| 10,536,436 B1* | 1/2020 | Barbour | H04L 63/0838 |
| 10,742,634 B1* | 8/2020 | Shahbazi | G06K 7/10821 |
| 10,742,645 B2* | 8/2020 | Hevizi | H04W 4/60 |
| 2007/0006291 A1 | 1/2007 | Barari et al. | |
| 2007/0067828 A1* | 3/2007 | Bychkov | H04L 63/1441 |
| | | | 726/3 |
| 2009/0210712 A1 | 8/2009 | Fort | |
| 2011/0264919 A1* | 10/2011 | Pizano | H04L 63/0861 |
| | | | 713/186 |
| 2013/0185780 A1 | 7/2013 | Varadharajan et al. | |
| 2013/0276080 A1 | 10/2013 | Nakonetzki et al. | |
| 2015/0188699 A1 | 7/2015 | Sung et al. | |
| 2015/0269566 A1* | 9/2015 | Gaddam | G06Q 20/385 |
| | | | 705/67 |
| 2015/0281222 A1* | 10/2015 | Burch | H04L 9/3228 |
| | | | 726/6 |
| 2015/0365235 A1* | 12/2015 | Hostyn | H04L 9/3228 |
| | | | 713/184 |
| 2016/0156619 A1* | 6/2016 | Lovelock | G06F 21/35 |
| | | | 726/7 |
| 2016/0241548 A1* | 8/2016 | Kim | H04W 12/082 |
| 2016/0301679 A1* | 10/2016 | Mortimore, Jr. | H04L 63/083 |
| 2016/0301688 A1 | 10/2016 | Baca et al. | |
| 2016/0307194 A1* | 10/2016 | Bhatnagar | H04W 12/04 |
| 2017/0061138 A1* | 3/2017 | Lambert | H04L 63/0428 |
| 2017/0331801 A1* | 11/2017 | Mezei | H04W 12/06 |
| 2017/0346851 A1* | 11/2017 | Drake | H04L 63/0428 |
| 2017/0357799 A1* | 12/2017 | Feher | G06F 21/34 |
| 2018/0075231 A1* | 3/2018 | Subramanian | G06F 16/86 |
| 2018/0097787 A1* | 4/2018 | Murthy | H04L 63/0236 |
| 2018/0097788 A1* | 4/2018 | Murthy | H04L 63/102 |
| 2018/0097789 A1* | 4/2018 | Murthy | H04L 63/0227 |
| 2018/0176212 A1* | 6/2018 | Nair | G06F 21/32 |
| 2018/0255053 A1* | 9/2018 | Bhabbur | H04L 63/0838 |
| 2018/0310174 A1* | 10/2018 | Rougier | H04W 12/06 |
| 2019/0013945 A1* | 1/2019 | Hamlin | H04W 12/06 |
| 2019/0036915 A1* | 1/2019 | Burch | H04W 12/06 |
| 2019/0065724 A1* | 2/2019 | Dudley | H04L 67/02 |
| 2019/0065731 A1* | 2/2019 | Brocious | H04L 9/3228 |
| 2019/0097804 A1* | 3/2019 | Parikh | H04L 9/3228 |
| 2019/0097987 A1* | 3/2019 | Talur | H04L 63/102 |
| 2019/0140844 A1* | 5/2019 | Brown | H04L 63/0853 |
| 2019/0190710 A1* | 6/2019 | Chopra | H04L 63/068 |
| 2019/0289017 A1* | 9/2019 | Agarwal | H04L 63/0838 |
| 2019/0303556 A1* | 10/2019 | Jain | G06F 21/445 |
| 2019/0306155 A1* | 10/2019 | Girdhar | H04L 9/3239 |
| 2019/0306156 A1* | 10/2019 | Agarwal | H04L 63/0846 |
| 2019/0306159 A1* | 10/2019 | Agarwal | H04L 9/321 |
| 2020/0014683 A1* | 1/2020 | Russell | G07F 17/329 |
| 2020/0074070 A1* | 3/2020 | Boodaei | G06F 21/33 |
| 2020/0084018 A1* | 3/2020 | Pande | H04L 9/0618 |
| 2020/0162255 A1* | 5/2020 | Hunt | H04L 63/0853 |

OTHER PUBLICATIONS

M'Raihi et al., TOTP: Time-Based One-Time Password Algorithm, Internet Engineering Task Force (IETF), May 2011, pp. 1-16.

* cited by examiner

SECURING USER SESSIONS

BACKGROUND

User sessions are often secured using a session cookie. The session cookie is sent to a client device for storage and subsequently presented to or "played" against an entity that controls access to a protected resource during the user session. In some computing environments, cookies are not restricted to being stored in the same location(s) where the cookies were stored or set when initially created. Instead, the cookies are free to move around among various computing systems. For example, a single sign-on (SSO) cookie may move around between different resource protecting entities that participate in an SSO scheme, whereby a user is permitted to access, using the SSO cookie, resources protected by other entities after authenticating with one of the entities to create a session for the user.

Whenever a session cookie is transmitted from one location to another, there is a risk that the user's session will be compromised (e.g., hacked or hijacked) due to the session cookie being intercepted by an unintended recipient. There are many ways in which a session can be compromised including, for example, use of a predictable session cookie, session sniffing, client-side attacks (e.g., cross-site scripting, malicious JavaScript code, Trojans, etc.), man-in-the-middle attacks, and man-in-the-browser attacks. Once a session cookie has been obtained by a hacker or hijacker, that person can take complete control of the user session by "replaying" the session cookie to impersonate the user. Accordingly, the use of session cookies alone often does not provide sufficient protection for a user session.

BRIEF SUMMARY

The present disclosure relates generally to techniques for securing user sessions using a time-based one-time password (TOTP). More particularly, techniques are described for using a shared secret to generate TOTPs in connection with authorization to access a protected resource during a session created for a user of a client device. Various inventive embodiments are described herein, including methods, systems, non-transitory computer-readable storage media storing programs, code, or instructions executable by one or more processors, and the like.

In certain embodiments, a TOTP is used in combination with a session cookie to determine whether to authorize access. When a user initiates an access request for a resource protected by an access management (AM) system, a WebGate (WG) in the AM system may intercept and redirect the request to an AM server. The AM server may then authenticate the user and, upon successful authentication, create a session for the user. As part of the session creation, a session cookie is set on, or sent to, the client device (e.g., by the AM server after successful authentication of the user). Additionally, a shared secret (e.g., an encrypted key generated as a hash of a user credential) is also generated by the client device for use during the session. The session cookie can be an SSO cookie that is presentable by the client device to enable SSO access during the session. The shared secret can be used by the client device to generate a TOTP for presentation, together with the SSO cookie, in a subsequent access request during the session.

In certain embodiments, the session cookie is presented by a Web browser or other application running on the client device to the WG. The WG determines, based on the session cookie and a TOTP included in a subsequent access request from the browser, whether to authorize the client device for access to a protected resource identified in the subsequent access request. In particular, the WG may determine, based on stored session information, whether a session identified by the cookie is valid and whether the TOTP matches a TOTP generated by the AM system using the same shared secret. A hacker trying to impersonate the user would need access to both the cookie and a valid TOTP. Because TOTPs are only valid for a specific time window (e.g., a thirty second window), a new valid TOTP would be needed each time a time window expires. Thus, even if the hacker were to gain access to the cookie and a valid TOTP, the hacker would only be able to access the user's session (e.g., to request a resource under the guise of the user) for a limited amount of time.

In certain embodiments, the use of TOTPs for securing a user session is selectively enabled for individual users (e.g., by configuring a TOTP protection feature for a particular username). TOTPs can be generated by an add-on application such as a browser plugin. The AM system may check whether the TOTP protection feature has been configured for the user and, if so, may require that the client device provide a valid TOTP whenever authorization is needed for an access request. If the TOTP protection feature has not been enabled, the AM system may proceed with a conventional authorization procedure in order to determine whether access should be granted.

In certain embodiments, the shared secret is generated by combining the user credential with one or more additional parameters, such as a Uniform Resource Locator (URL) of the resource currently being requested and/or the session cookie. Because the URL is specific to each request (and therefore changes depending on what is being requested), this reduces the likelihood that a hacker who captured a TOTP could reuse the TOTP for accessing the user's session, even if the captured TOTP has not yet expired.

In certain embodiments, an access management system includes one or more processors and a memory coupled to the processor(s), the memory storing a plurality of instructions that when executed by the one or more processors cause the processor(s) to perform processing comprising receiving, during a session established for a username, an access request from a client application, the access request identifying a resource to be accessed; extracting a session cookie from the access request, the session cookie comprising information identifying the session; and extracting a first time-based one-time password (TOTP) from the access request, the first TOTP being generated by the client application. The instructions further cause the processor(s) to perform processing comprising generating a second TOTP using a key that has been configured for the username; determining, using the session cookie, whether the session is valid; determining, whether the first TOTP matches the second TOTP; and controlling access to the resource by the client application based upon outcomes of the determining whether the session is valid and the determining whether the first TOTP matches the second TOTP.

The foregoing, together with other features and embodiments will become more apparent upon referring to the following specification, claims, and accompanying drawings.

DETAILED DESCRIPTION

Figure 1:
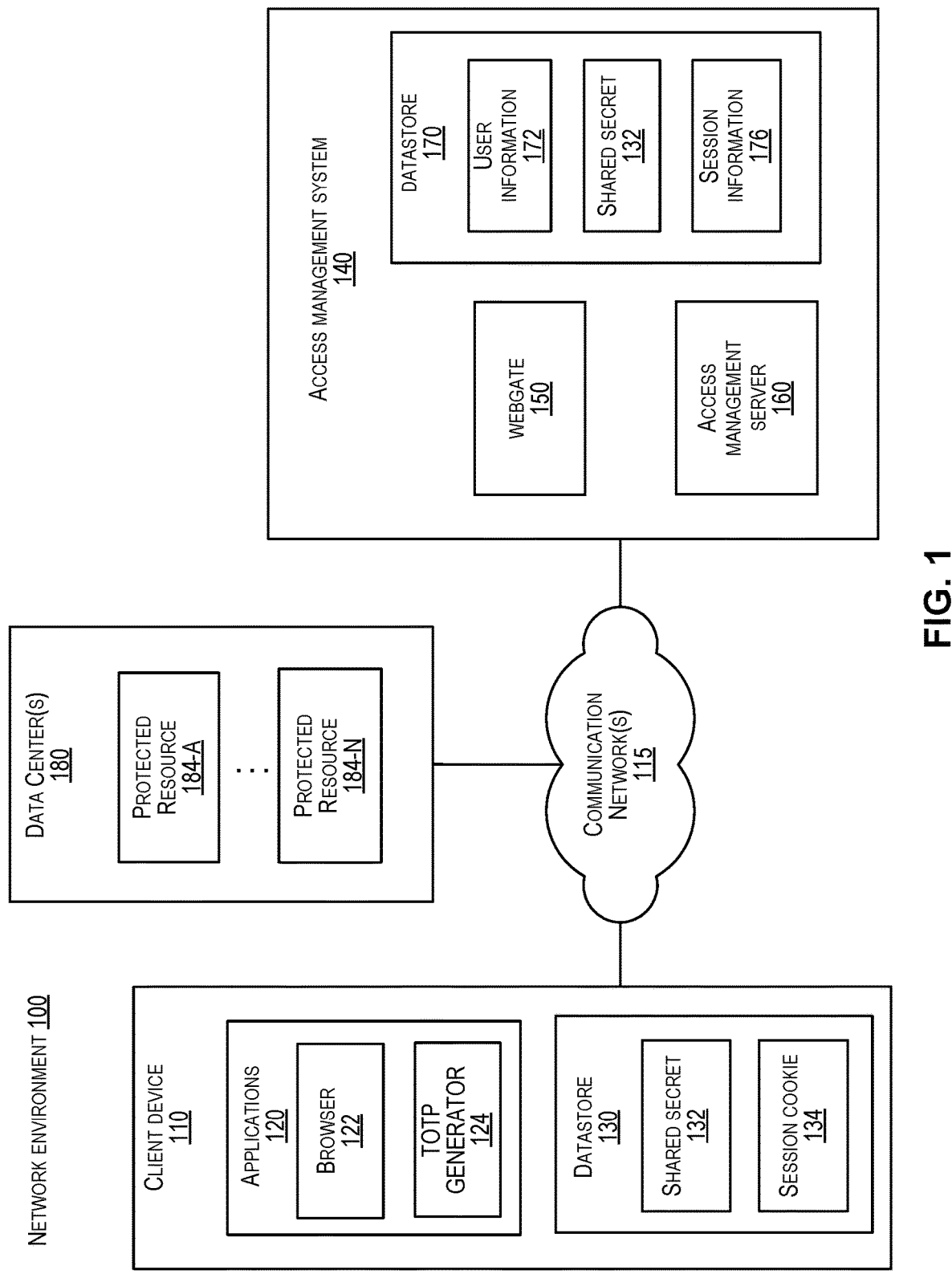
FIG. 1 is a simplified block diagram of a distributed environment incorporating an exemplary embodiment.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to techniques for securing user sessions using a TOTP. More particularly, techniques are described for using a shared secret to generate TOTPs in connection with authorization to access a protected resource during a session created for a user of a client device. Various inventive embodiments are described herein, including methods, systems, non-transitory computer-readable storage media storing programs, code, or instructions executable by one or more processors, and the like.

In certain embodiments, a TOTP is used in combination with a session cookie to determine whether to authorize access. When a user initiates an access request for a resource protected by an access management (AM) system, a Web-Gate (WG) in the AM system may intercept and redirect the request to an AM server. The AM server may then authenticate the user and, upon successful authentication, create a session for the user. As part of the session creation, a session cookie is set on, or sent to, the client device (e.g., by the AM server after successful authentication of the user). Additionally, a shared secret (e.g., an encrypted key generated as a hash of a user credential) is also generated by the client device for use during the session. The session cookie can be an SSO cookie that is presentable by the client device to enable SSO access during the session. The shared secret can be used by the client device to generate a TOTP for presentation, together with the SSO cookie, in a subsequent access request during the session.

In certain embodiments, the session cookie is presented by a Web browser or other application running on the client device to the WG. The WG determines, based on the session cookie and a TOTP included in a subsequent access request, whether to authorize the client device for access to a protected resource identified in the subsequent access request. In particular, the WG may determine, based on stored session information, whether a session identified by the cookie is valid. The WG may further determine whether the TOTP matches a TOTP generated by the AM system using the same shared secret. A hacker trying to impersonate the user would need access to both the cookie and a valid TOTP. Because TOTPs are only valid for a specific time window, a new valid TOTP would be needed each time a time window expires. Thus, even if the hacker were to gain access to the cookie and a valid TOTP, the hacker would only be able to access the user's session (e.g., to request a resource under the guise of the user) for a limited amount of time.

In certain embodiments, the use of TOTPs for securing a user session is selectively enabled for individual users (e.g., by configuring a TOTP protection feature for a particular username). TOTPs can be generated by an add-on application (e.g., as a browser plugin) on behalf of the client application that generates access requests. The AM system may check whether the TOTP protection feature has been configured for the user and, if so, may require that the client device provide a valid TOTP whenever authorization is needed for an access request. In some embodiments, the TOTP protection feature is configuration on a per user basis. If the TOTP protection feature has not been enabled, the AM system may proceed with a conventional authorization procedure in order to determine whether to grant access.

In certain embodiments, the shared secret is generated by combining the user credential with one or more additional parameters, such as the URL of the resource currently being requested and/or the session cookie. Because the URL is specific to each request (and therefore changes depending on what is being requested), this reduces the likelihood that a hacker who captured a TOTP could reuse the TOTP for accessing the user's session, even if the captured TOTP has not yet expired.

For purposes of this application, a session is a set of computing resources established for a limited period of time between a resource managing entity (e.g., an AM system) and a client device for the purpose of servicing requests communicated from the client device to the resource managing entity, including requests for access to resources. Resources that are the subject of an access request may include any item managed and/or stored by one or more data centers and available for access by one or more users. Such items include files (such as documents, spreadsheets, and images), computational resources (such as processing power, cloud storage, and network communication bandwidth), software applications, and/or the like. A resource may be protected or unprotected. If a resource is protected, a user may need to be authenticated and authorized in order to access the resource. A session may be created on behalf of the user of the client device and for a particular application running on the client device and/or for a particular set of processes running within the application. A session can be created through an initial authentication of the user (e.g., by verifying one or more user credentials against stored user information). Upon expiration of the session, the user may be required to re-authenticate (e.g., to renew the session or create a new session). A user may have multiple sessions active at any given time. An SSO session permits a user to authenticate once and then access protected resources in a computing system without having to re-authenticate for the duration of the SSO session.

FIG. 1 is a simplified block diagram of a distributed network environment 100 incorporating an exemplary embodiment. Network environment 100 may comprise multiple systems communicatively coupled to each other via one or more communication networks 115. The systems in FIG. 1 include one or more client devices 110, one or more data centers 180, and a AM system 140 communicatively coupled to each other via communication network(s) 115. Network environment 100 depicted in FIG. 1 is merely an example and is not intended to unduly limit the scope of claimed embodiments. One of ordinary skill in the art would recognize many possible variations, alternatives, and modifications. For example, in some implementations, network environment 100 may have more or fewer systems or components than those shown in FIG. 1, may combine two or more systems, or may have a different configuration or arrangement of systems.

Communication network 115 facilitates communications between the various systems depicted in FIG. 1. Communication network 115 can be of various types and can include one or more communication networks. Examples of communication network 115 include, without restriction, the Internet, a wide area network (WAN), a local area network (LAN), an Ethernet network, a public or private network, a wired network, a wireless network, and the like, and combinations thereof. Different communication protocols may be used to facilitate the communications, including both wired and wireless protocols such as the Institute of Electrical and Electronics (IEEE) 802.XX suite of protocols, TCP/IP, IPX, SAN, AppleTalk®, Bluetooth®, and other protocols. In general, communication network 115 may include any infrastructure that facilitates communications between the various systems depicted in FIG. 1.

Each of the systems and computing devices in FIG. 1 may include a data processing component (e.g., one or more processors) and one or more memory resources (e.g., volatile and/or non-volatile memory). Processors may include single or multicore processors. Processors may include general purpose microprocessors such as ones provided by Intel®, AMD®, ARM®, Freescale Semiconductor, Inc., and the like, that operate under the control of software stored in associated memory. Memory resources may be provided for storing instructions and/or data associated with an operating system and applications or processes executed by the processors. For convenience, memory resources are depicted in FIG. 1 as datastores, with each computing device or system having a single datastore. However, other memory resource configurations are also possible.

Client device 110 can be any computing device configured for requesting access to a protected resource and in the manner described herein. For example, client device 110 may be a desktop or laptop running an application through which the user supplies an authentication factor (e.g., a username and/or a password, or some other knowledge based factor) to the AM system 140. In certain embodiments, the client device 110 includes a Web browser 122 operable to request access to a resource identified according to a URL and to transmit a user supplied credential for verification by the AM system 140. The browser 122 and/or other applications 120 may communicate with an application running on a remote computing system (e.g., an application running in the data center 180 or an application running in an external application system) to access the resource after permission has been granted by the AM system 140. The applications 120 may further include a TOTP generator 124 operable to generate a TOTP as a function of a shared secret 132 and further as a function of a local time of the client device 110.

TOTP generator 124 can be browser plugin/extension/add-on or a standalone application and is configured to generate TOTPs as a function of the shared secret 132 and further as a function of a local time on the client device 110. The TOTP generator 124 may be configured to automatically add a TOTP to each access request (e.g., to a header portion of the access request).

Client device 110 may further include, or may be communicatively coupled to, one or more datastores 130 that store the shared secret 132 and a session cookie 134. The shared secret 132 may be stored in an encrypted format and is used by the TOTP generator 124 for generating TOTPs. Session cookie 134 can also be stored encrypted and may comprise information about a session created for the user of the client device 110 (e.g., a session identifier (ID), a user ID, an identifier of an access management server that created the session, a session expiration time, etc.).

Applications executed within the network environment 100 may use one or more resources. These resources may be distributed and virtualized within network environment 100. For example, the resources may be spread across one or more data centers 180 and can include protected resources (e.g., protected resources 184) and unprotected resources. While only one data center 180 is depicted in FIG. 1 for purposes of simplicity, a typical distributed environment includes multiple data centers distributed in network environment 100, possibly at different geographical locations. Each data center may comprise multiple types of resources. Use of and access to these resources may be managed by one or more virtual machines executed by the data centers. In some embodiments, the data center 180 is a cloud based data center that provides on-demand access to resources. The configuration of data center 180 depicted in FIG. 1 is just an example and is not intended to be limiting.

AM system 140 may include one or more computing devices configured to perform authentication and authorization in connection with access requests from the client device 110. For example, AM system 140 may include an AM server 160 configured to authenticate a user by comparing one or more user supplied credentials to stored user information 172. In some embodiments, AM server 160 is a server running Oracle Access Manager (OAM) software. AM server 160 may be communicatively coupled to a WG 150 configured to intercept access requests from the client device 110 and to redirect the access requests to the AM server 160 for processing. For example, WG 150 may intercept access requests that are Hypertext Transfer Protocol (HTTP) formatted and sent from browser 122. AM server 160 may create a session for the user in response to a successful authentication based on one or more user supplied credentials. Session creation may comprise generating session information (e.g., generating a session ID, determining a session validity period, etc.) and associating the session with the user (e.g., by linking the session ID to a user ID, which can be a user credential such as a username).

Session creation may further comprise setting one or more cookies on the client device 110 for the user session. In certain embodiments, the AM server 160 may itself set a cookie (e.g., an "OAM_ID cookie") in addition to instructing the WG 150 to set a cookie (e.g., an "OAMAuthnCookie" and/or an "ObSSOCookie"). OAM_ID cookie, OAMAuthnCookie and ObSSOCookie are examples of cookies used in Oracle Access Manager. For example, following a successful authentication of a previously unauthenticated user, an OAM server (e.g., AM server 160) may set the OAM_ID cookie and redirect the client device to a WebGate (e.g., WG 150) that sets the OAMAuthnCookie and/or the ObSSOCookie in response to the redirect. While all three of these cookies are session cookies, single sign-on across computing systems (e.g., computing systems running different applications that request access to resources on behalf of the user of client device 110) is provided through the OAM_ID cookie. Each of the cookies created for the session may be stored for use by the client device 110 (e.g., in a browser cache).

Each of the above mentioned cookies may be set on or sent to the client device 110 to enable the client device to present the cookie(s) to the WG 150 and/or the AM server 160. The contents of the cookies vary, but each cookie may generally include information about the user (e.g., a user ID) and information about the session (e.g., a session ID). The WG 150 and/or the AM server 160 may determine, based on stored session information 176, whether or not the session identified by a cookie is valid. The session information 176 may comprise the same information which was included in a cookie previously sent to the client device 110 (e.g., a session ID). The session information 176 may further comprise additional information which is not included in any cookie, such as information about what processes are associated with the session and various parameters that have been configured for the session by the AM server 160. Thus, the WG 150 and/or the AM server 160 can determine whether there exists a corresponding session in the session information 176 for the session identified by the cookie and whether the corresponding session is still valid (e.g., the expiration time for the session has not been reached, the session has not timed out due to user inactivity, etc.).

TOTP generator 124 may be further configured to generate the shared secret 132. TOTP generator 124 may generate the shared secret by reading one or more user credentials submitted for authentication of the user. In certain embodiments, AM server 160 may be configured to generate the shared secret 132 independently of the TOTP generator 124. In certain embodiments, the shared secret 132 is generated by applying a cryptographic hash function to one or more user credentials (e.g., a username and/or a password). Examples of hash functions suitable for generating shared secret 132 include Secure Hash Algorithm-256 (SHA-256) and SHA-512. The shared secret is used as a key for generating TOTPs. In some embodiments, TOTPs are generated using a user credential-based key together with one or more additional keys as input to a TOTP generation algorithm. For example, the shared secret 132 can be input together with a session cookie (e.g., a session cookie extracted from an access request) and/or a requested URL. In some embodiments, the additional keys are also generated using a cryptographic hash function (e.g., by applying the same hash function that was applied to the user credentials to the session cookie and/or the requested URL).

WG 150 may perform authorization to determine whether to grant access to a protected resource 184 of the data center 180. Authorization may include, for example, querying the AM server 160 for an authorization policy associated with a requested resource and determining whether the username associated with the access request has sufficient privileges to be granted access based on the authorization policy. In some embodiments, the determination of whether the user is authorized is performed by the AM server 160, which returns a response to the WG 150 indicating whether or not the user is authorized. As will be explained below, additional conditions for authorizing access to a protected resource can include the possession of a valid TOTP and the existence of a valid user session.

Example flowcharts and process diagrams depicting processing performed during handling of an access request will now be described in connection with FIGS. 2 to 6. The processing depicted in FIGS. 2 to 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processes and methods presented in FIGS. 2 to 6 and described below are intended to be illustrative and non-limiting. Although FIGS. 2 to 6 depict various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIGS. 2 to 6 may be performed by one or more components of an AM system (e.g., WG 150 and/or AM server 160).

Figure 2:
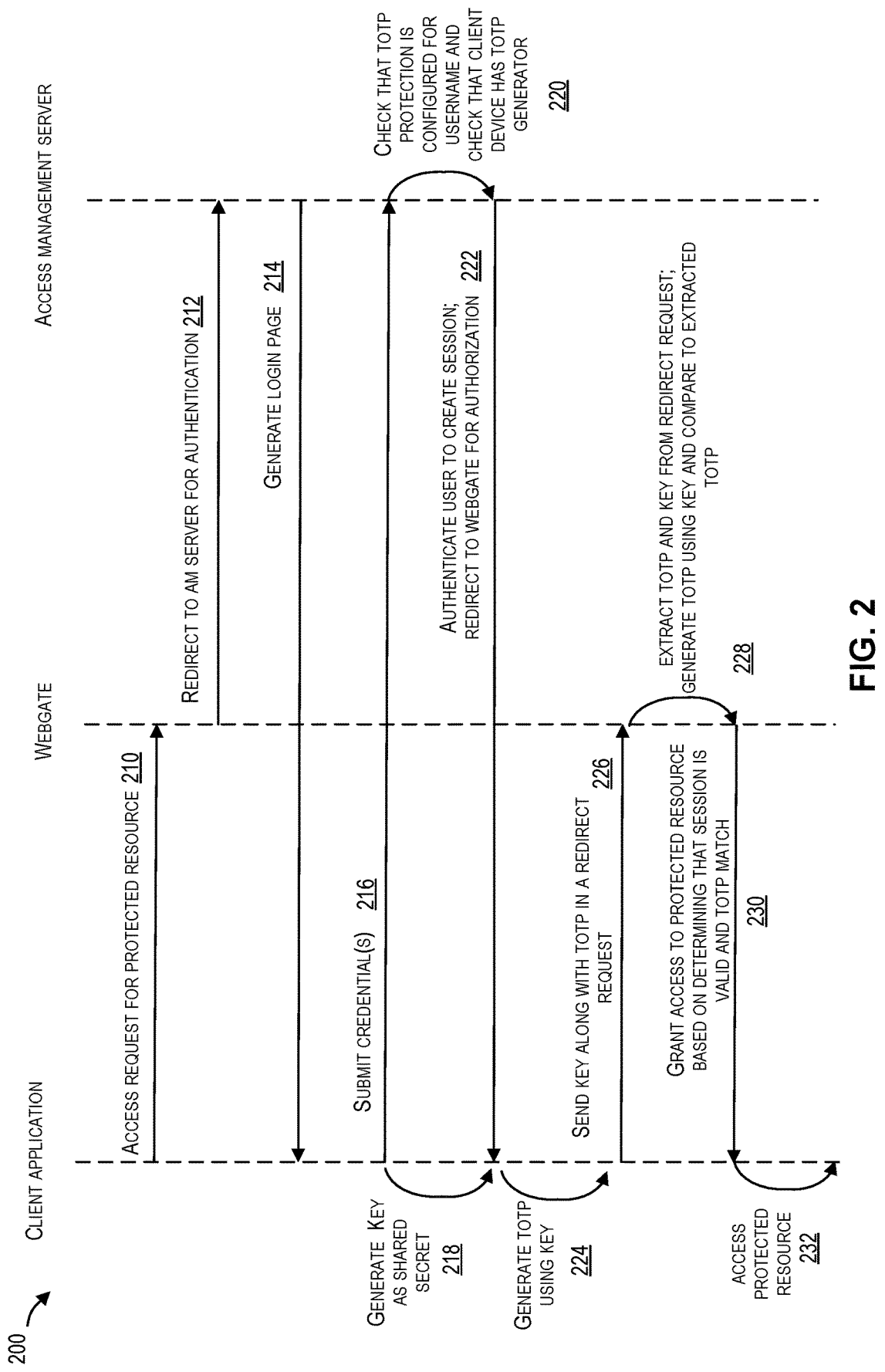
FIG. 2 is a simplified process diagram of a process for configuring a client device for generating TOTPs, according to certain embodiments.

FIG. 2 is a simplified process diagram of a process 200 for configuring a client device for generating TOTPs, according to certain embodiments. The process 200 involves steps performed by an application on a client device (e.g., browser 122), a WG (e.g., WG 150) and an AM server (e.g., AM server 160).

At step 210, the client application sends an access request for a protected resource on behalf of a user. The access request can be sent in response to user interaction with the client application (e.g., opening a URL associated with the protected resource). The access request is intercepted by the WG.

At step 212, the WG redirects to the AM server for authentication of the user. The redirect in step 212 may involve generating an authentication request for processing by the AM server.

At step 214, the AM server generates a login page for submission of one or more user credentials. In some embodiments, the login page comprises a first login screen requesting input of a username followed by a second login screen requesting input of a password and/or an additional authentication factor. The second login screen can be presented after the first login screen (e.g., after performing the check in step 220 below).

At step 216, the user submits the requested credential(s) through the client application.

At step 218, the client application generates a key as a shared secret, using the credential(s) supplied by the user in step 216. Thus, the key can be configured for the username of the user. The key can be generated using the TOTP generator, assuming the TOTP generator has been installed on the client device. For example the TOTP generator may read the credentials when they are input to the login page. In some embodiments, step 218 may be performed after step 220 below.

At step 220, the AM server receives the credential(s) and checks that TOTP protection has been configured for the user (e.g., by looking up the username in a directory in the user information 172). If the TOTP protection feature has been configured, the AM server may determine whether the client device has a TOTP generator installed. This determination can be performed by checking for the presence of a special header in the access request. If a header is found, then this implies that the TOTP generator has already been installed. If no header is found, then this indicates that no TOTP generator has been installed, and the AM server may direct the application to a source (e.g., an online application store or a Web page) from which the TOTP generator can be downloaded and installed, e.g., as a browser plugin. As part of the TOTP generator installation and setup, the TOTP generator can be configured with a setting indicating what shared secret(s) to use for generating TOTPs. In certain embodiments, this may default to some predefined shared secret (e.g., a password associated with the username). In other embodiments, what shared secret to use (e.g., password, session cookie, URL, or any combination thereof) may be user-configurable.

At step 222, the AM server authenticates the user based on the credential(s) submitted in step 216 (e.g., by comparing the user supplied credentials to credentials stored in association with the username). In response to successful authentication, the AM server creates a session for the user. In particular, the AM server establishes the session for the username. As part of the session creation, the AM server may send/set one or more session cookies (e.g., an OAM_ID cookie) on the client device for use by the application. After creating the session, the AM server redirects the client application to the WG for authorization. If the AM server is an OAM server, the redirect may comprise an "obrar.cgi" authentication response. The redirect may include the following information encrypted for forwarding by the client application to the WG: 1) an indication of whether TOTP protection has been configured for the user, and 2) the key. In an alternative embodiment, the AM server may generate the key independently in response to successful authentication in step 222 (since the AM server received the user credentials) and may send the key to the WG instead of directing the client application to send the key to the WG. Thus, the AM server and the client application may generate the key separately.

At step 224, the client application generates a TOTP using the key generated in step 218. All subsequent requests from the client application (e.g., subsequent authorization requests or subsequent authentication requests) will have a special header injected into them by the client application using the TOTP generator. This special header can include the same information as the header described in connection with step 220 (e.g., information indicating that the TOTP generator has been installed) and further includes a TOTP generated using the key and further using a current local time of the client device.

At step 226, in response to the redirect in step 222, the client application sends a redirect request to the WG. The redirect request includes the key from step 218 along with the TOTP generated in step 224. The redirect request may further include an indication that TOTP protection has been configured for the username. If the AM server is an OAM server, the redirect request may be in the form of an "obrareq.cgi" request.

At step 228, the WG extracts the TOTP and the key from the redirect request and generates a corresponding TOTP using the extracted key and as a function of a local time of the WG. The WG then compares the extracted TOTP to the corresponding TOTP.

At step 230, the WG grants access to the protected resource based on determining that the session is valid and that the TOTPs match. The determination of session validity can be performed through sending a query to the AM server after receiving the redirect request. Since the AM server created the session, the AM server has access to the information (e.g., session information 176) needed to determine whether the session is valid. The access grant can be further conditioned upon successful completion of an authorization procedure (not depicted).

At step 232, the client application accesses the protected resource.

Figure 3:
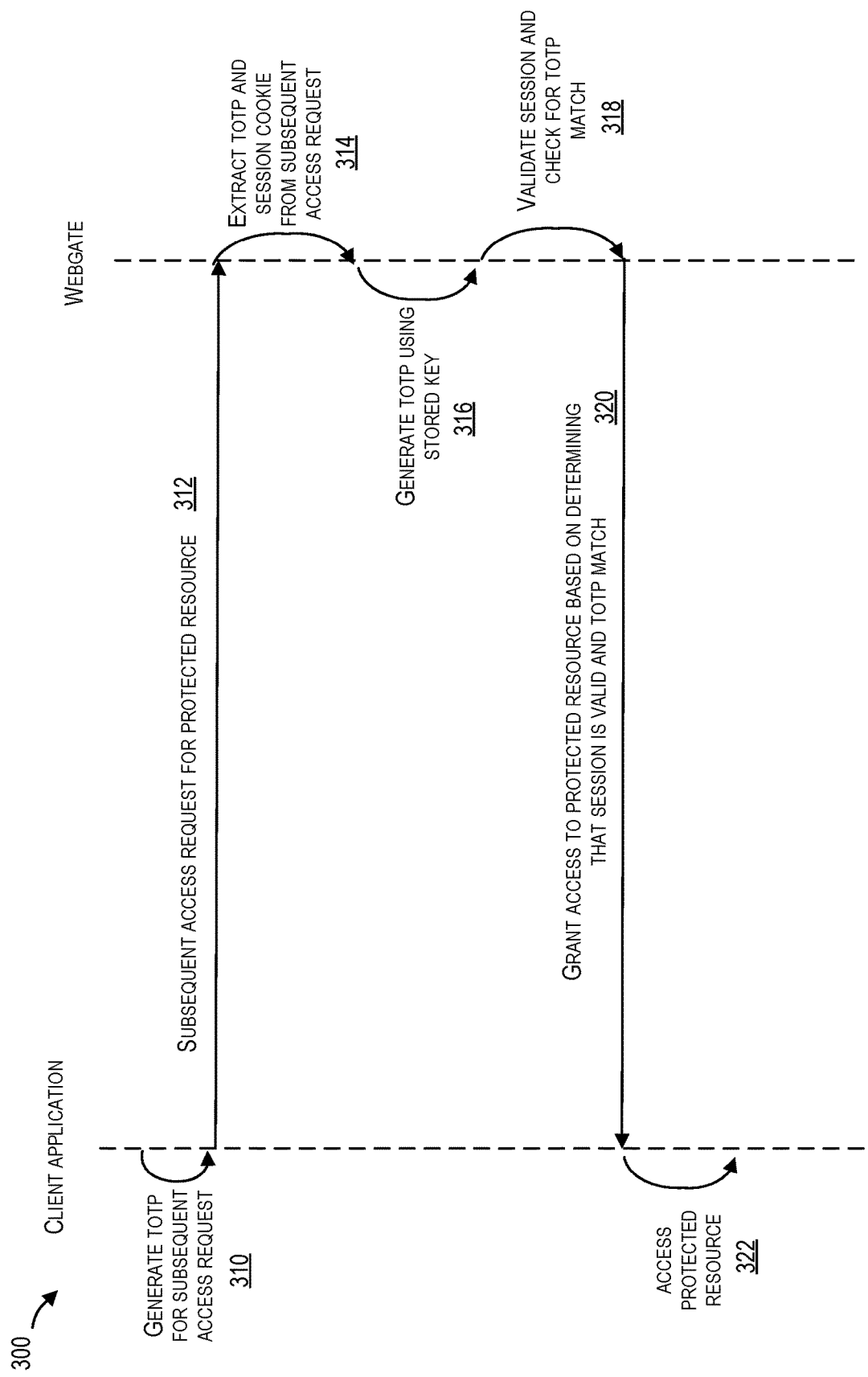
FIG. 3 is a simplified process diagram of a process for handling a subsequent access request, according to certain embodiments.

FIG. 3 is a simplified process diagram of a process 300 for handling a subsequent access request, according to certain embodiments. The process 300 can be performed by a client application (e.g., browser 122) and a WG (e.g., WG 150) and assumes that the client application has been successfully configured with a shared secret for generating TOTPs (e.g., based on the processing of an initial access request as shown in FIG. 2).

At step 310, the client application generates a TOTP for a subsequent access request, using the shared secret.

At step 312, the client application sends the subsequent access request, which can be for the same protected resource identified in an earlier access request or for a different protected resource. The subsequent access request includes the TOTP generated in step 310, which can be added to a special header of the subsequent access request by the client application/TOTP generator. The subsequent access request further includes a session cookie, which can be an SSO cookie.

At step 314, the WG extracts the TOTP and the session cookie from the subsequent access request.

At step 316, the WG generates a corresponding TOTP based on the same shared secret used to generate the TOTP in step 310 (e.g., a key sent to the WG during processing of the earlier access request) and as a function of the local time of the WG.

At step 318, the WG validates the session based on the session cookie (e.g., by identifying a session from the contents of the session cookie and requesting an AM server to determine, based on stored session information, whether the identified session is valid). In some embodiments, the WG may forward the session cookie to the AM server for determining whether the session is valid. The WG also checks whether the corresponding TOTP from step 316 and the extracted TOTP from step 314 match.

At step 320, the WG grants access to the protected resource based on determining that the session is valid and the TOTPs match. The access grant can be further conditioned upon successful completion of an authorization procedure (not depicted).

At step 322, the client application accesses the protected resource.

Figure 4:
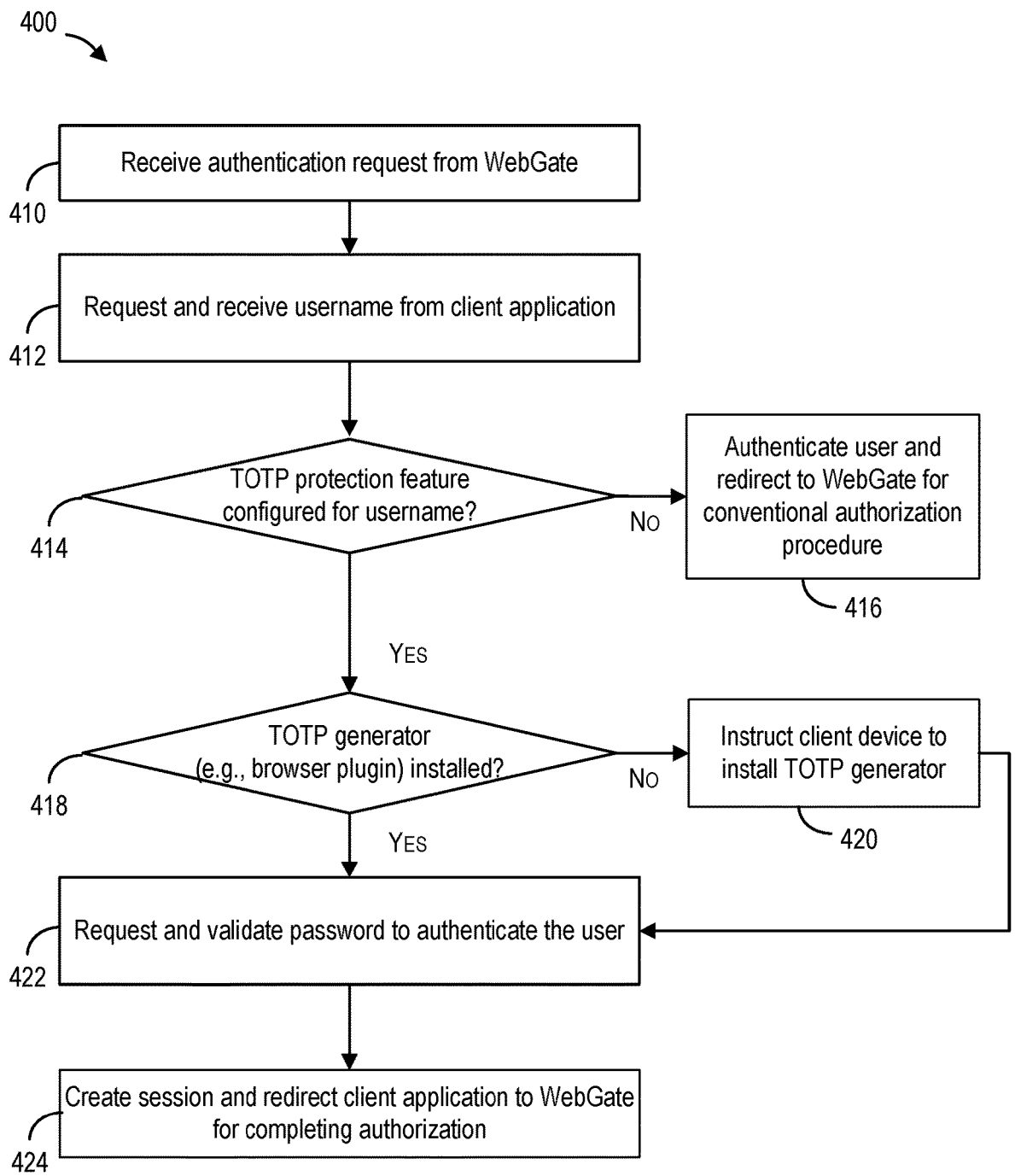
FIG. 4 is a simplified flowchart depicting processing performed by an access management system for handling an authentication request, according to certain embodiments.

FIG. 4 is a simplified flowchart depicting a method 400 for handling an authentication request, according to certain embodiments. The method 400 can be performed by an AM server (e.g., AM server 160).

At step 410, an authentication request is received from a WG (e.g., WG 150). The authentication request may have been sent in response to the WG intercepting an access request from a client application and determining, by the WG, that the user of the client application has not yet been authenticated with the AM system.

At step 412, a request for a username is sent to the client application (e.g., through a login page) and the username is received.

At step 414, a determination is made whether the TOTP protection feature has been configured for the username received in step 412. This determination can be performed based on stored user information (e.g., a Lightweight Directory Access Protocol (LDAP) directory stored as part of user information 172 in FIG. 1). If the TOTP protection feature has not been configured for the username, then the method 400 proceeds to step 416, where the user is authenticated (e.g., based on the username and/or additional user credentials such as the password in step 422 below) and redirected to the WG for performing a conventional authorization procedure. Otherwise, the method proceeds to step 418.

At step 418, a determination is made whether a TOTP generator (e.g., TOTP generator 124) has been installed on the client device. As mentioned earlier, this determination can be made by checking for the presence of a header in the access request. If no TOTP generator has been installed, the client device is instructed to install the TOTP generator (step 420) before proceeding to step 422.

At step 422, a user password is requested and validated to successfully authenticate the user. Although depicted as a separate step, the password can be requested together with the username in step 412. The password can be validated based on stored user information (e.g., by looking up the corresponding password associated with the username in the user information 172).

At step 424, a session is created for the username and the client application is redirected to the WG for completing authorization. The redirect may instruct the client application to send: 1) a key for generating TOTPs to the WG together with 2) an indication that TOTP protection has been configured for the username.

Figure 5:
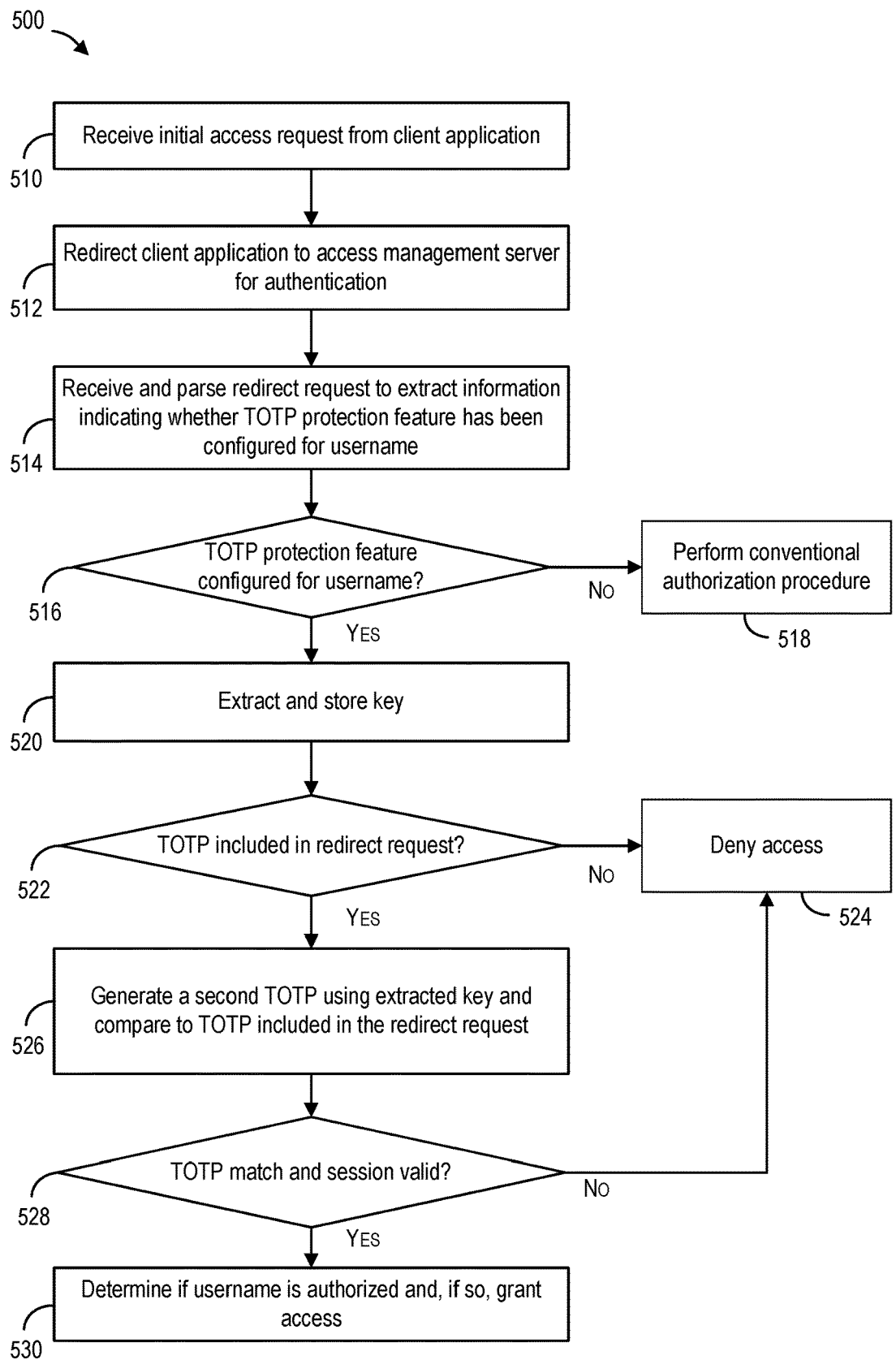
FIG. 5 is a simplified flowchart depicting processing performed by an access management system for authorizing access to a protected resource in connection with an initial access request, according to certain embodiments.

FIG. 5 is a simplified flowchart depicting a method 500 for authorizing access to a protected resource in connection with an initial access request, according to certain embodiments. The method 500 can be performed by a WebGate (e.g., WG 150).

At step 510, the initial access request is received from the client application. The access request may identify a protected resource to be accessed by the client application.

At step 512, the client application is redirected to an AM server (e.g., AM server 160) for authentication. For example, the WG may trigger the authentication procedure depicted in FIG. 4.

At step 514, a redirect request is received and parsed to extract information indicating whether the TOTP protection feature has been configured for a username associated with the access request. This information may have been determined by the AM server during the authentication in step 512 and can be included in a header of the redirect request. The redirect request may further include a shared secret for generating TOTPs and information (e.g., a session ID) about a session that was created for the user based on successful authentication in step 512.

At step 516, a determination is made, based on the information extracted in step 514, whether the TOTP protection feature has been configured for the username. If the TOTP protection feature has not been configured, then a conventional authorization procedure is performed (step 518). Otherwise, the method proceeds to step 520. The outcome of the determination whether the TOTP protection feature has been configured for the username can be stored for use by the WG (or AM server) in processing subsequent access requests. For example, once it has been determined that the TOTP protection feature has been configured for the username, the WG or AM server can be configured to expect a TOTP in a header of each subsequent request associated with the same username and, if no header is present or no TOTP is present, deny the subsequent request. If the determination of whether the TOTP protection feature has been configured for the username is delegated to the WG, the WG may store information indicating that the TOTP protection feature has been configured (e.g., in a local datastore accessible to WG) and reference this information when processing subsequent access requests.

At step 520, a key (e.g., shared secret 132 in FIG. 1) is extracted from the redirect request. The extracted key may be stored (e.g. by the WG) for use in generating TOTPs for comparison to TOTPs in subsequent requests.

At step 522, a determination is made whether the redirect request includes a TOTP. Since it was determined earlier in step 516 that the TOTP protection feature has been configured, it can be expected that the redirect request and each subsequent request sent from the client application on behalf of the same user will contain a TOTP (assuming that the client application has been properly configured to use the key). The key and the TOTP may both be contained in the header of the redirect request. Subsequent requests may not include any key. If the redirect request or a subsequent request does not contain a valid TOTP, this may indicate that the client application/TOTP generator has not been properly configured or that there has been an attempt to hack the user's session. Thus, the access request that was received in step 510 should be denied if no TOTP is included in the redirect request (step 524). However, if there is a TOTP in the redirect request, then the method proceeds to step 526.

At step 526, a second TOTP is generated (e.g., by WG 150) using the key that was extracted in step 520. The second TOTP is also a function of a local time of the device on which it is generated (e.g., the local time of WG 150). The second TOTP is compared to the TOTP included in the redirect request to determine whether the TOTPs match. In order for the TOTPs to match, the key used to generate the TOTP on the client side needs to be the same as the key used to generate the TOTP on the AM system side. The times used to generate the TOTPs also need to be synchronized. Different mechanisms may be used to synchronize these times. In certain embodiments, the WG (or the AM server) knows the skew in time between the time on the client device and the time on the WG or AM server, and takes the skew into consideration when generating a TOTP for comparison against a TOTP generated by the client application.

At step 528, a determination is made whether the TOTPs match based on the comparison in step 526. Additionally, a determination is made whether the session associated with the redirect request is valid. The WG 150 may check with the AM server 160 to validate the session. In particular, WG 150 may send a query to the AM server 160 for information (e.g., session information 176 in FIG. 1) that enables WG 150 to determine whether the session is valid. Alternatively, AM server 160 may perform session validation and return a response back to WG 150 indicating whether or not the session is valid. If the TOTPs match and the session is valid, the method proceeds to step 530. Otherwise, access is denied (step 524).

At step 530, a determination is made whether the username is authorized to access to the protected resource and, if so, then access is granted to the protected resource. The determination of whether the username is authorized can be performed by WG 150 and/or AM server 160 using a conventional authorization procedure (e.g., the same procedure used in step 518 when TOTP protection has not been configured for the username). Authorization may involve, for example, WG 150 requesting one or more authorization policies from AM server 160 and applying those policies to determine whether the conditions specified in the policies are satisfied. Examples of conditions that may be included in an authorization policy include conditions relating to the identity of the user (e.g., whether the username belongs to a group of authorized users), temporal conditions (e.g., specific times when a resource is permitted to be accessed), and conditions relating to a session attribute (e.g., whether an authentication level associated with the identified session meets a required authentication level). Each authorization policy may be a policy associated with the username and/or the requested resource. An authorization policy may include one or more rules that govern access including, for example, rules that specify conditions for which access is allowed and/or rules that specify conditions for which access is denied.

Figure 6:
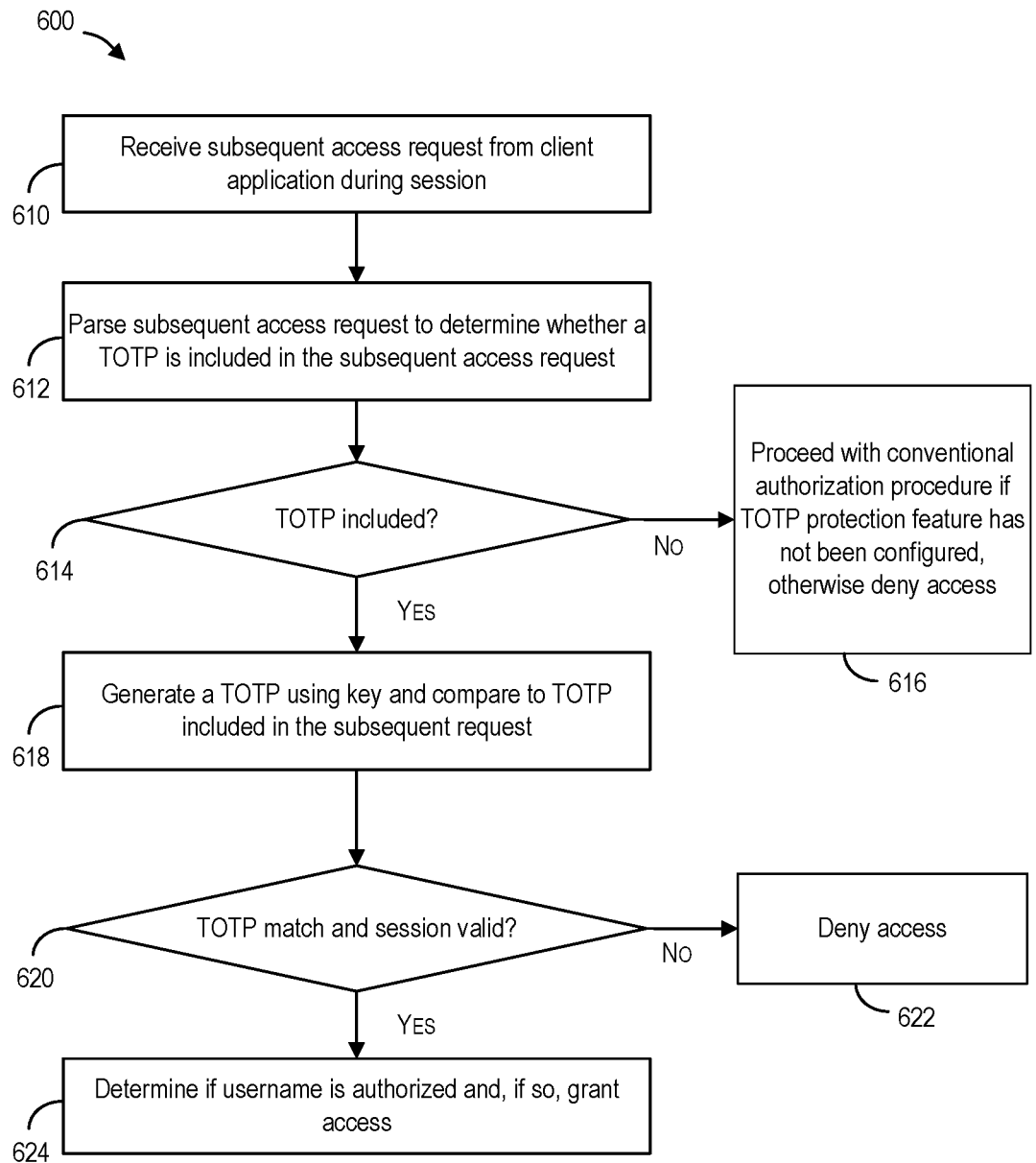
FIG. 6 is a simplified flowchart depicting processing performed by an access management system for authorizing access to a protected resource in connection with a subsequent access request, according to certain embodiments.

FIG. 6 is a simplified flowchart depicting processing performed by an access management system for authorizing access to a protected resource in connection with a subsequent access request, according to certain embodiments. The method 600 can be performed by an WebGate (e.g., WG 150).

At step 610, the subsequent access request is received from the client application during a session. The subsequent access request may identify a protected resource to be accessed by the client application. This protected resource can be the same resource identified in an earlier request (e.g., the initial access request that resulted in creation of the session) or a different resource. For example, if the user was earlier authenticated in connection with an access request for "abc.com," a subsequent access request for "xyz.com" may not require that the user re-authenticate. Instead, the WG may determine whether the user is authorized to access the different resource based on whether there is a valid session and whether the client application has presented a valid TOTP. If the client application has been properly configured to generate TOTPs, then the subsequent access request will include a TOTP (e.g., in a header of the subsequent access request).

At step 612, the subsequent access request is parsed to determine whether a TOTP is included or not (step 614). If no TOTP is included, then the WG may proceed with a conventional authorization procedure, provided that the TOTP protection feature has not been configured for the username associated with the subsequent access request (step 616). However, if no TOTP is included and the TOTP protection feature has been configured for the username (e.g., as indicated by information extracted from the redirect request described in connection with FIG. 5), then the WG should deny access. The username or some other user identifier can be determined based on information in the subsequent access request (e.g., based on a user ID contained in a session cookie transmitted as part of the subsequent access request or by looking up the user ID associated with a session ID contained in the session cookie). In some embodiments, the subsequent access request may explicitly indicate the username. The username or user identifier determined from the subsequent access request can then be checked against stored information (e.g., information stored in response to a positive determination in step 516 of FIG. 5) to determine whether TOTP protection has been configured for the username. The method proceeds to step 618 if a TOTP is included in the subsequent access request.

At step 618, a second TOTP is generated using a stored key that has been configured for the username associated with the subsequent access request (e.g., a key obtained according to the method depicted in FIG. 5). The second TOTP is compared to the TOTP included in the subsequent access request.

At step 620, a determination is made whether the TOTPs compared in step 618 match. Additionally, a determination is made whether a session identified by the subsequent access request is valid (e.g., based on validation of a session identified in a session cookie included in the subsequent access request). The session validation in step 618 can be performed by the WG and/or AM server, in a similar manner to that described with respect to step 528 of FIG. 5. If the TOTPs do not match or the session is invalid, then access is denied (step 622). Otherwise, the method proceeds to step 624.

At step 624, a determination is made whether the username is authorized and, if so, access to the resource is granted. The determination in step 624 can be performed using the same authorization procedure described above in connection with step 530 of FIG. 5.

The granting of access may be further conditioned upon the session cookie being valid. That is, the session cookie may be checked for authenticity and correctness of the information contained in the session cookie. For the sake of simplicity, session cookie validation has been omitted from the discussion above. However, it will be understood that any time a session cookie is included in a request received by the AM system, the session cookie can be checked for validity by the AM system (e.g., by a WG or AM server). In certain embodiments, session cookie validity is a prerequisite condition for making a determination whether the session identified by the session cookie is valid.

In certain embodiments, the processing depicted in FIG. 6 is performed only with respect to SSO sessions, since SSO cookies can move around between different resource protection entities and/or between different applications that access to resources and are therefore susceptible to being intercepted by a malicious party. Thus, the session cookie included in the subsequent access request may be an SSO cookie (e.g., an OAM_ID cookie). However, the processing depicted in FIG. 6 can also be performed with respect to non-SSO sessions.

Although FIGS. 2 to 6 depict certain processing being performed at a WG, such processing can be delegated to an AM server. Similarly, processes described as being performed by an AM server may be delegated to a WG. For example, in some embodiments, the checking of TOTPs is performed by AM server 160. However, it may be advantageous to use a WG for checking TOTPs and for performing other processing steps involved in determining whether to grant access, since the WG may be located in closer proximity to the client device (and therefore able to communicate with the client device with less delay compared to AM server 160) and in order to prevent the AM server 160 from potentially being overwhelmed by concurrent access requests from multiple client devices.

As mentioned earlier, multiple keys/parameters can be used for generating a TOTP. In general, any shared secret may be used as a key for TOTP generation. For example, the key could be a hash of a username and/or password. If multi-factor authentication is used for authenticating the user, then any of the factors (e.g., fingerprints, answers to secret questions) or combinations thereof can be used. Other examples mentioned earlier include session cookies (which are essentially strings of data) and a requested URL. In certain embodiments, at least one unique key is generated for any particular user. The underlying data of the key(s) may be kept secret by generating the key(s) using cryptographic hash functions.

The use of a requested URL as a key is advantageous because the requested URL may change with each request. For example, the client application may request a resource identified by "test.html" and then later request another resource identified by "test2.html." The WG or other entity responsible for checking the TOTPs presented by the client application would know the requested URL (since this is communicated with the request) and would be able to apply the requested URL as an additional input, along with another shared secret such as a hash of the user's password, to a TOTP generation algorithm (e.g., the same algorithm used by TOTP generator 124).

Figure 7:
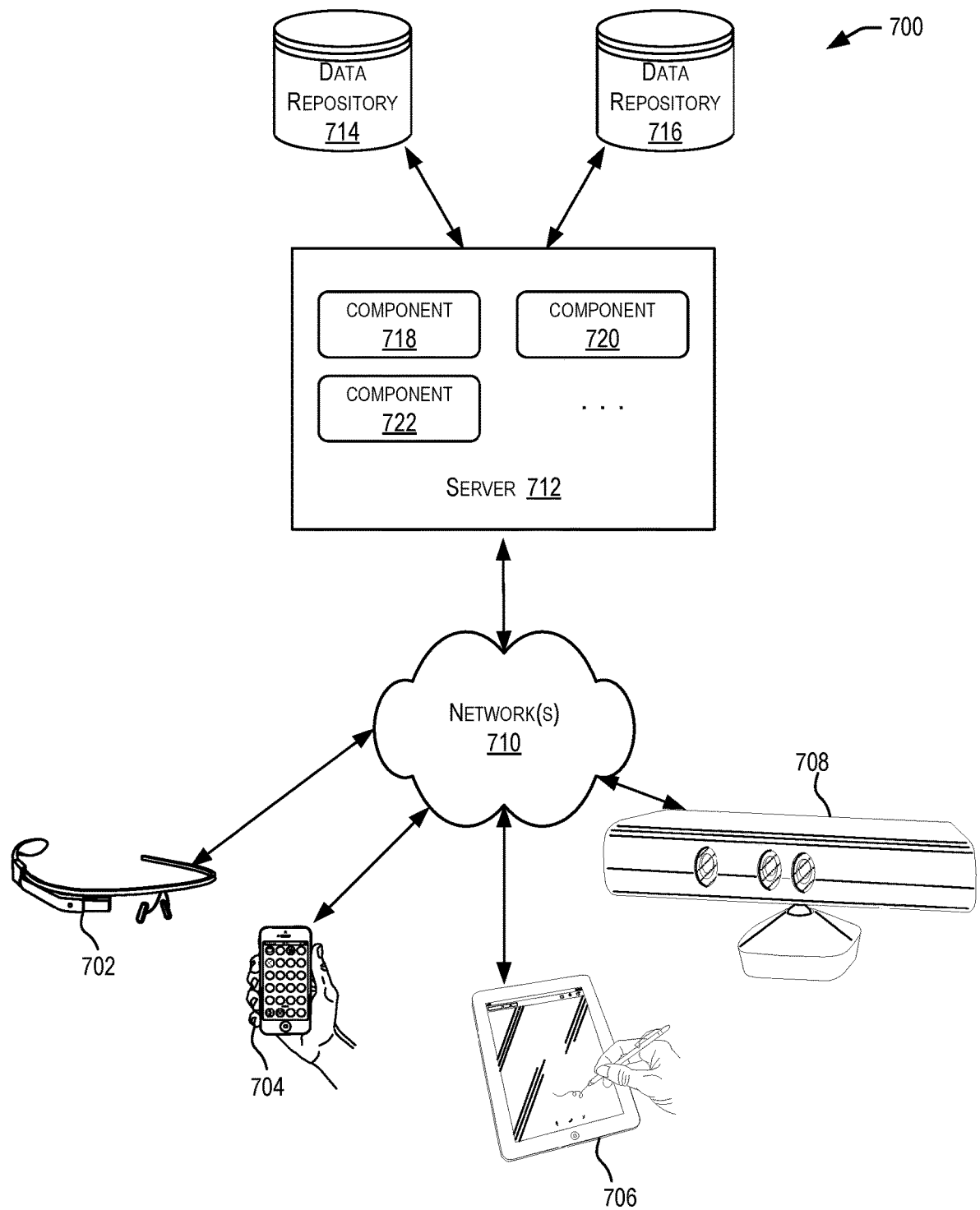
FIG. 7 is a simplified diagram of a distributed system for implementing one or more embodiments.

FIG. 7 depicts a simplified diagram of a distributed system 700 for implementing an embodiment. In the illustrated embodiment, distributed system 700 includes one or more client computing devices 702, 704, 706, and 708, coupled to a server 712 via one or more communication networks 710. Clients computing devices 702, 704, 706, and 708 may be configured to execute one or more applications.

In various embodiments, server 712 may be adapted to run one or more services or software applications that enable access to resources during a user session based on checking of TOTPs.

In certain embodiments, server 712 may also provide other services or software applications that can include non-virtual and virtual environments. In some embodiments, these services may be offered as web-based or cloud services, such as under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, server 712 may include one or more components 718, 720 and 722 that implement the functions performed by server 712. These components may include software components that may be executed by one or more processors, hardware components, or combinations thereof. It should be appreciated that various different system configurations are possible, which may be different from distributed system 700. The embodiment shown in FIG. 7 is thus one example of a distributed system for implementing an embodiment system and is not intended to be limiting.

Users may use client computing devices 702, 704, 706, and/or 708 to request access to resources in accordance with the teachings of this disclosure. A client device may provide an interface that enables a user of the client device to interact with the client device. The client device may also output information to the user via this interface. Although FIG. 7 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 710 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 710 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the IEEE 802.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization such as one or more flexible pools of logical storage devices that can be virtualized to maintain virtual storage devices for the server. In various embodiments, server 712 may be adapted to run one or more services or software applications that provide the functionality described in the foregoing disclosure.

The computing systems in server 712 may run one or more operating systems including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more data repositories 714, 716. These data repositories may be used to store data and other information in certain embodiments. For example, one or more of the data repositories 714, 716 may be used to store resources available for access by authorized users and/or information used for determining whether to grant access to a requested resource (e.g., user information and/or session information). Data repositories 714, 716 may reside in a variety of locations. For example, a data repository used by server 712 may be local to server 712 or may be remote from server 712 and in communication with server 712 via a network-based or dedicated connection. Data repositories 714, 716 may be of different types. In certain embodiments, a data repository used by server 712 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 714, 716 may also be used by applications to store application data. The data repositories used by applications may be of different types such as, for example, a key-value store repository, an object store repository, or a general storage repository supported by a file system.

Figure 8:
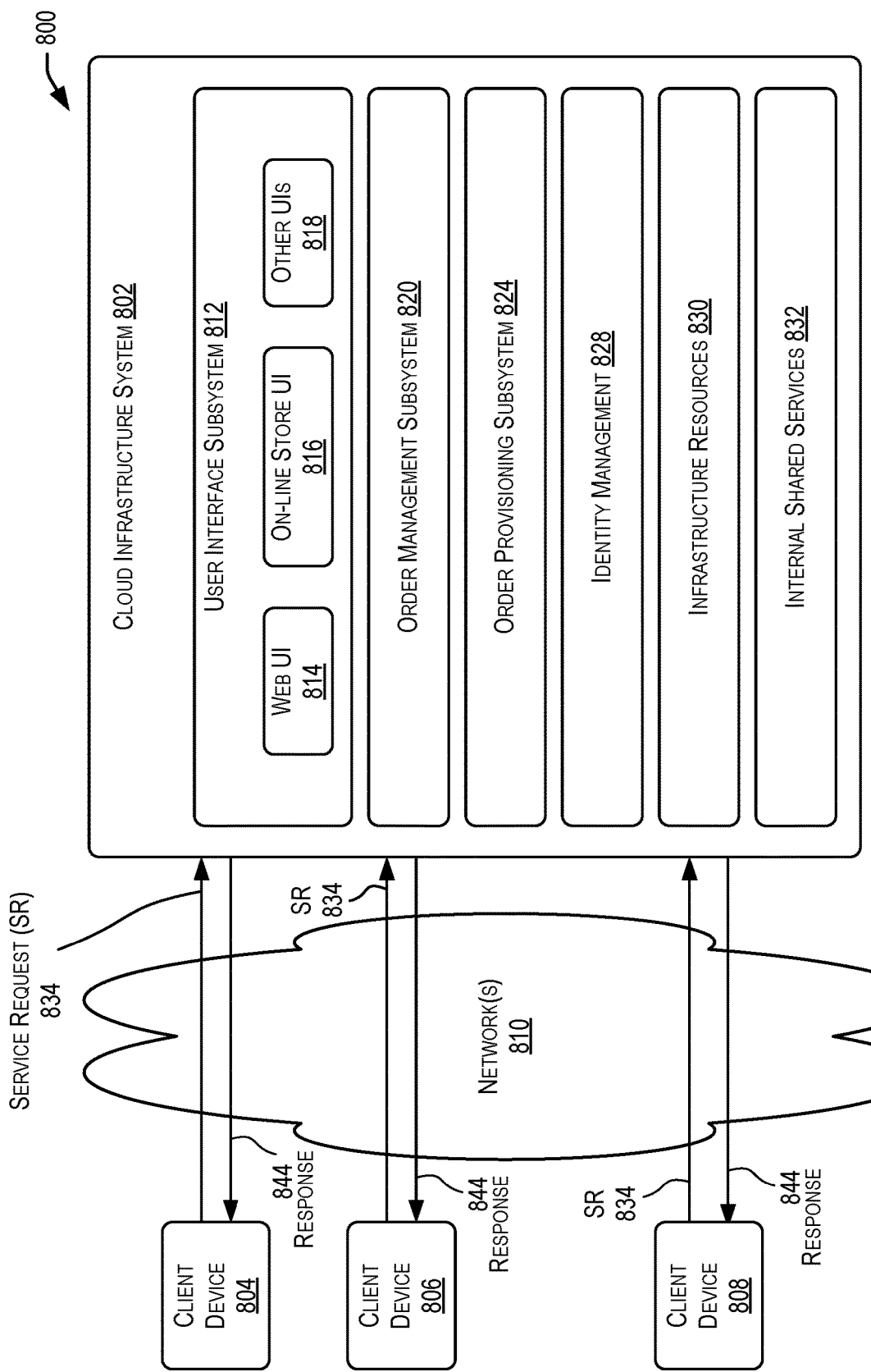
FIG. 8 is a simplified block diagram of a cloud-based system environment in which various session security-related services may be offered as cloud services, in accordance with certain embodiments.

In certain embodiments, the session security-related functionalities described in this disclosure may be offered as services via a cloud environment. FIG. 8 is a simplified block diagram of a cloud-based system environment in which various session security-related services may be offered as cloud services, in accordance with certain embodiments. In the embodiment depicted in FIG. 8, cloud infrastructure system 802 may provide one or more cloud services that may be requested by users using one or more client computing devices 804, 806, and 808. Cloud infrastructure system 802 may comprise one or more computers and/or servers that may include those described above for server 712. The computers in cloud infrastructure system 802 may be organized as general purpose computers, specialized server computers, server farms, server clusters, or any other appropriate arrangement and/or combination.

Network(s) 810 may facilitate communication and exchange of data between clients 804, 806, and 808 and cloud infrastructure system 802. Network(s) 810 may include one or more networks. The networks may be of the same or different types. Network(s) 810 may support one or more communication protocols, including wired and/or wireless protocols, for facilitating the communications.

The embodiment depicted in FIG. 8 is only one example of a cloud infrastructure system and is not intended to be limiting. It should be appreciated that, in some other embodiments, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative embodiments.

The term cloud service is generally used to refer to a service that is made available to users on demand and via a communication network such as the Internet by systems (e.g., cloud infrastructure system 802) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 802. Cloud infrastructure system 802 then performs processing to provide the services requested in the customer's subscription order. For example, a subscription order can be made to configure TOTP protection for a particular username. Cloud infrastructure system 802 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public customer, where the customer can be an individual or an enterprise. In certain other embodiments, under a private cloud model, cloud infrastructure system 802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 802 and the services provided may be shared by several organizations in a related community. Various other models such as hybrids of the above mentioned models may also be used.

Client computing devices 804, 806, and 808 may be of different types (such as devices 702, 704, 706, and 708 depicted in FIG. 7) and may be capable of operating one or more client applications. A user may use a client device to interact with cloud infrastructure system 802, such as to request a service provided by cloud infrastructure system 802. For example, a user may use a client device to request a session security-related service described in this disclosure.

In some embodiments, the processing performed by cloud infrastructure system 802 for providing session security-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 802 for determining whether or not to configure TOTP protection for a particular username (e.g., in order to identify sensitive data and to provide TOTP based security for users likely to access the sensitive data). The data used for this analysis may include structured data (e.g., data stored in a database or structured according to a structured model) and/or unstructured data (e.g., data blobs (binary large objects)).

As depicted in the embodiment in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like.

In certain embodiments, to facilitate efficient provisioning of these resources for supporting the various cloud services provided by cloud infrastructure system 802 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users or customers of cloud infrastructure system 802 to interact with cloud infrastructure system 802. User interface subsystem 812 may include various different interfaces such as a web interface 814, an online store interface 816 where cloud services provided by cloud infrastructure system 802 are advertised and are purchasable by a consumer, and other interfaces 818. For example, a customer may, using a client device, request (service request 834) one or more services provided by cloud infrastructure system 802 using one or more of interfaces 814, 816, and 818. For example, a customer may access the online store, browse cloud services offered by cloud infrastructure system 802, and place a subscription order for one or more services offered by cloud infrastructure system 802 that the customer wishes to subscribe to. The service request may include information identifying the customer and one or more services that the customer desires to subscribe to. For example, a customer may place a subscription order for a session security-related service offered by cloud infrastructure system 802. As part of the order, the customer may provide information identifying one or more usernames for which TOTP protection should be configured.

In certain embodiments, such as the embodiment depicted in FIG. 8, cloud infrastructure system 802 may comprise an order management subsystem (OMS) 820 that is configured to process the new order. As part of this processing, OMS 820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 802 may send a response or notification 844 to the requesting customer to indicate when the requested service is now ready for use. In some instances, information (e.g., a link) may be sent to the customer that enables the customer to start using and availing the benefits of the requested services. In certain embodiments, for a customer requesting the session security-related service, the response may include a confirmation that TOTP protection has been successfully configured for a particular username.

Cloud infrastructure system 802 may provide services to multiple customers. For each customer, cloud infrastructure system 802 is responsible for managing information related to one or more subscription orders received from the customer, maintaining customer data related to the orders, and providing the requested services to the customer. Cloud infrastructure system 802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 802 may provide services to multiple customers in parallel. Cloud infrastructure system 802 may store information for these customers, including possibly proprietary information. In certain embodiments, cloud infrastructure system 802 comprises an identity management subsystem (IMS) 828 that is configured to manage customers information and provide the separation of the managed information such that information related to one customer is not accessible by another customer. IMS 828 may be configured to provide various security-related services such as identity services, such as information access management, authentication and authorization services, services for managing customer identities and roles and related capabilities, and the like.

Figure 9:
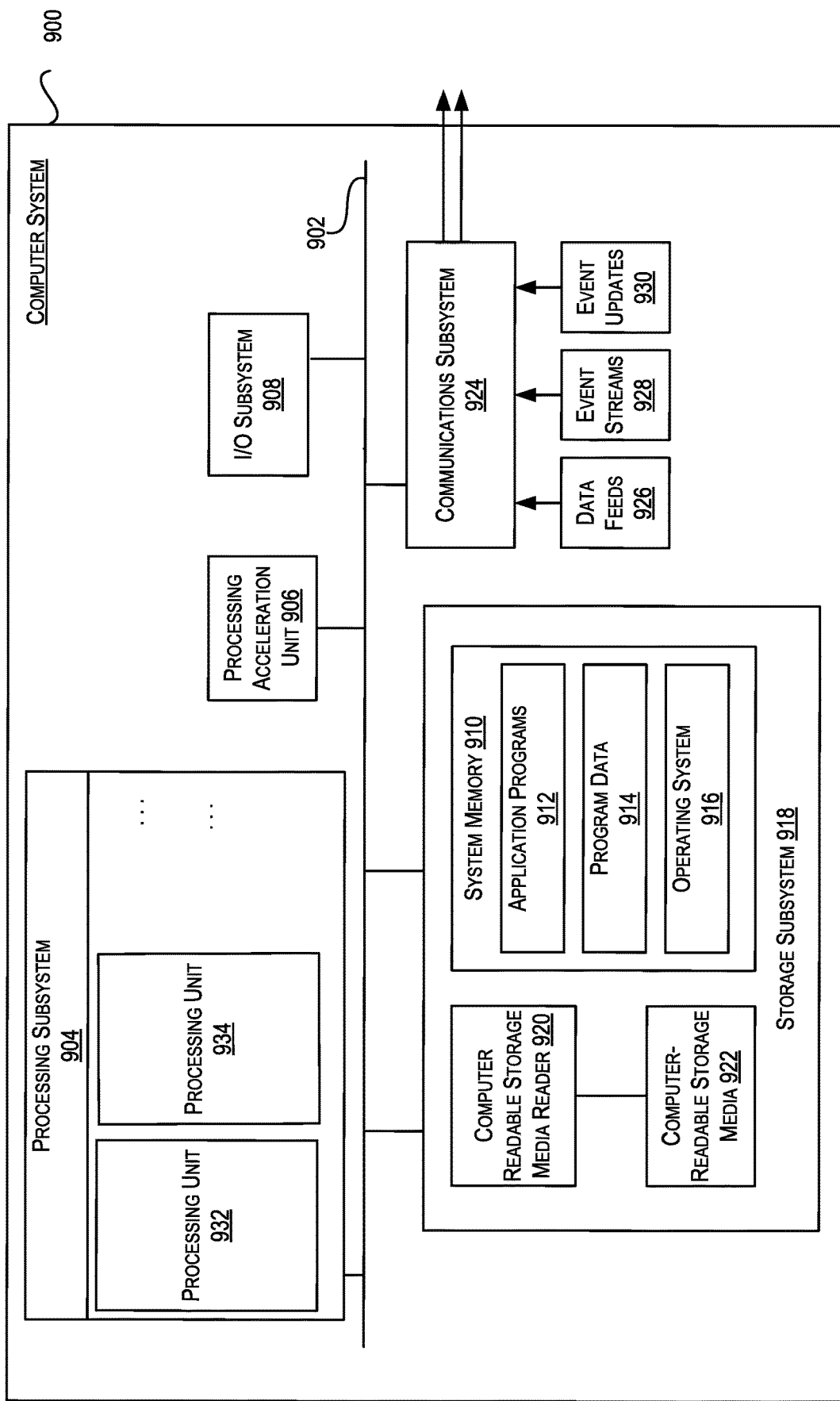
FIG. 9 illustrates an exemplary computer system that may be used to implement certain embodiments.

FIG. 9 illustrates an exemplary computer system 900 that may be used to implement certain embodiments. For example, in some embodiments, computer system 900 may be used to implement any of the client devices, data centers, access management systems and various servers and computer systems described above. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may include be single core or multicore processors. The processing resources of computer system 900 can be organized into one or more processing units 932, 934, etc. A processing unit may include one or more processors, one or more cores from the same or different processors, a combination of cores and processors, or other combinations of cores and processors. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above. In instances where computer system 900 is executing one or more virtual machines, one or more processing units may be allocated to each virtual machine.

In certain embodiments, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®. Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices.

Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some embodiments. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide a repository for storing data used in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), and the like.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 922 may store programming and data constructs that provide the functionality of some embodiments. Computer-readable media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 918 may also include a computer-readable storage media reader 920 that can further be connected to computer-readable storage media 922. Reader 920 may receive and be configured to read data from a memory device such as a disk, a flash drive, etc.

In certain embodiments, computer system 900 may support virtualization technologies, including but not limited to virtualization of processing and memory resources. For example, computer system 900 may provide support for executing one or more virtual machines. In certain embodiments, computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. For example, the communication subsystem may be used to request and receive user credentials and to send a redirect request to a client device for forwarding a shared secret to a WebGate.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:
1. A method comprising:
receiving, by an access management system (AMS), during a session established for a user credential, an access request from a client application, the access request identifying a resource to be accessed by a user associated with the user credential;
extracting, by the AMS, a session cookie from the access request, the session cookie comprising information identifying the session;
extracting, by the AMS, a first time-based one-time password (TOTP) from the access request, the first TOTP being generated by the client application as a function of: (i) a shared key, and (ii) a local time of a client device running the client application, wherein the shared key is generated by a TOTP generator installed on the client device using the user credential, and the shared key is communicated to the AMS in an encrypted redirect request sent in response to authentication of the user based on the user credential;
generating, by the AMS, a second TOTP as a function of: (i) the shared key, and (ii) a local time of the AMS;
determining, by the AMS using the session cookie, whether the session is valid;
determining, by the AMS, whether the first TOTP matches the second TOTP; and
controlling, by the AMS, access to the resource by the client application based upon outcomes of the determining whether the session is valid and the determining whether the first TOTP matches the second TOTP.

2. The method of claim 1, wherein the controlling of access to the resource by the client application comprises granting access to the resource based on determining that the session is valid and that the first TOTP matches the second TOTP.

3. The method of claim 1, wherein the shared key is generated using the user credential, at least one additional user credential, and one or more cryptographic hash functions.

4. The method of claim 1, wherein the local time of the client device and the local time of the AMS are synchronized based on the AMS knowing a skew between the local time of the client device and the local time of the AMS.

5. The method of claim 1, further comprising:
receiving, by the AMS, a second access request after the access request; and
denying the second access request in response to determining, by the AMS, that the second access request does not include any TOTP.

6. The method of claim 1, further comprising receiving, by the AMS prior to the access request, the shared key in the encrypted redirect request from the client application.

7. The method of claim 1, wherein the first TOTP and the second TOTP are each generated as a function of: (i) the shared key, (ii) the local time of the client device or the AMS, and (iii) at least one additional parameter selected from the following: a Uniform Resource Locator (URL) associated with the resource, a cryptographic hash of the URL associated with the resource, the session cookie, and a cryptographic hash of the session cookie.

8. A non-transitory computer-readable memory storing a plurality of instructions that when executed by one or more processors cause the one or more processors to perform processing comprising:
receiving, by an access management system (AMS), during a session established for a user credential, an access request from a client application, the access request identifying a resource to be accessed by a user associated with the user credential;
extracting, by the AMS, a session cookie from the access request, the session cookie comprising information identifying the session;
extracting, by the AMS, a first time-based one-time password (TOTP) from the access request, the first TOTP being generated by the client application as a function of: (i) a shared key, and (ii) a local time of a client device running the client application, wherein the shared key is generated by a TOTP generator installed on the client device using the user credential, and the shared key is communicated to the AMS in an encrypted redirect request sent in response to authentication of the user based on the user credential;
generating, by the AMS, a second TOTP as a function of: (i) the shared key, and (ii) a local time of the AMS;
determining, by the AMS using the session cookie, whether the session is valid;
determining, by the AMS, whether the first TOTP matches the second TOTP; and
controlling, by the AMS, access to the resource by the client application based upon outcomes of the determining whether the session is valid and the determining whether the first TOTP matches the second TOTP.

9. The non-transitory computer-readable memory of claim 8, wherein the generating of the second TOTP is conditioned upon a determination that TOTP protection has been configured for the user credential.

10. The non-transitory computer-readable memory of claim 9, wherein the determination that the TOTP protection has been configured for the user credential is performed in connection with an earlier access request.

11. The non-transitory computer-readable memory of claim 9, wherein the instructions further cause the one or more processors to perform processing comprising based on the determination that TOTP protection has been configured for the user credential, determining, by the AMS, whether the access request includes any TOTP.

12. The non-transitory computer-readable memory of claim 8, wherein the instructions further cause the one or more processors to perform processing comprising receiving, by the AMS prior to the access request, the shared key in the encrypted redirect request from the client application.

13. The non-transitory computer-readable memory of claim 8, wherein the shared key is a cryptographic hash of the user credential, and wherein the first TOTP and the second TOTP are each generated as a function of: (i) the shared key, (ii) the local time of the client device or the AMS, and (iii) at least one additional parameter selected from the following: a Uniform Resource Locator (URL) associated with the resource, a cryptographic hash of the URL associated with the resource, the session cookie, and a cryptographic hash of the session cookie.

14. An access management system (AMS) comprising:
one or more processors; and
a memory coupled to the one or more processors, the memory storing a plurality of instructions that when executed by the one or more processors cause the one or more processors to perform processing comprising:
receiving, during a session established for a user credential, an access request from a client application, the access request identifying a resource to be accessed by a user associated with the user credential;
extracting a session cookie from the access request, the session cookie comprising information identifying the session;
extracting a first time-based one-time password (TOTP) from the access request, the first TOTP being generated by the client application as a function of: (i) a shared key, and (ii) a local time of a client device running the client application, wherein the shared key is generated by a TOTP generator installed on the client device using the user credential, and the shared key is communicated to the AMS in an encrypted redirect request sent in response to authentication of the user based on the user credential;
generating a second TOTP as a function of: (i) the shared key, and (ii) a local time of the AMS;
determining using the session cookie, whether the session is valid;

determining whether the first TOTP matches the second TOTP; and controlling access to the resource by the client application based upon outcomes of the determining whether the session is valid and the determining whether the first TOTP matches the second TOTP.

15. The access management system of claim 14, wherein the instructions further cause the one or more processors to perform processing comprising:

determining that TOTP protection has been configured for the user credential; and based on the determining that the TOTP protection has been configured for the user credential, determining whether the access request includes any TOTP.

16. The access management system of claim 14, wherein the instructions further cause the one or more processors to perform processing comprising receiving, prior to the access request, the shared key in the encrypted redirect request from the client application.

17. The access management system of claim 14, wherein the shared key is a cryptographic hash of the user credential, and wherein the first TOTP and the second TOTP are each generated as a function of: (i) the shared key, (ii) the local time of the client device or the AMS, and (iii) at least one additional parameter selected from the following: a Uniform Resource Locator (URL) associated with the resource, a cryptographic hash of the URL associated with the resource, the session cookie, and a cryptographic hash of the session cookie.

\* \* \* \* \*

UNITED STATES PATENT AND TRADEMARK OFFICE
CERTIFICATE OF CORRECTION

PATENT NO. : 11,283,793 B2
APPLICATION NO. : 16/164750
DATED : March 22, 2022
INVENTOR(S) : Khanna et al.

It is certified that error appears in the above-identified patent and that said Letters Patent is hereby corrected as shown below:

In the Specification

In Column 22, Line 56, delete "Google) Glass®." and insert -- Google Glass®). --, therefor.

In the Claims

In Column 28, Line 66, in Claim 14, delete "determining" and insert -- determining, --, therefor.

Signed and Sealed this
Sixteenth Day of August, 2022

Katherine Kelly Vidal
*Director of the United States Patent and Trademark Office*